INVENTOR.
Richard R. Coleman, Jr.

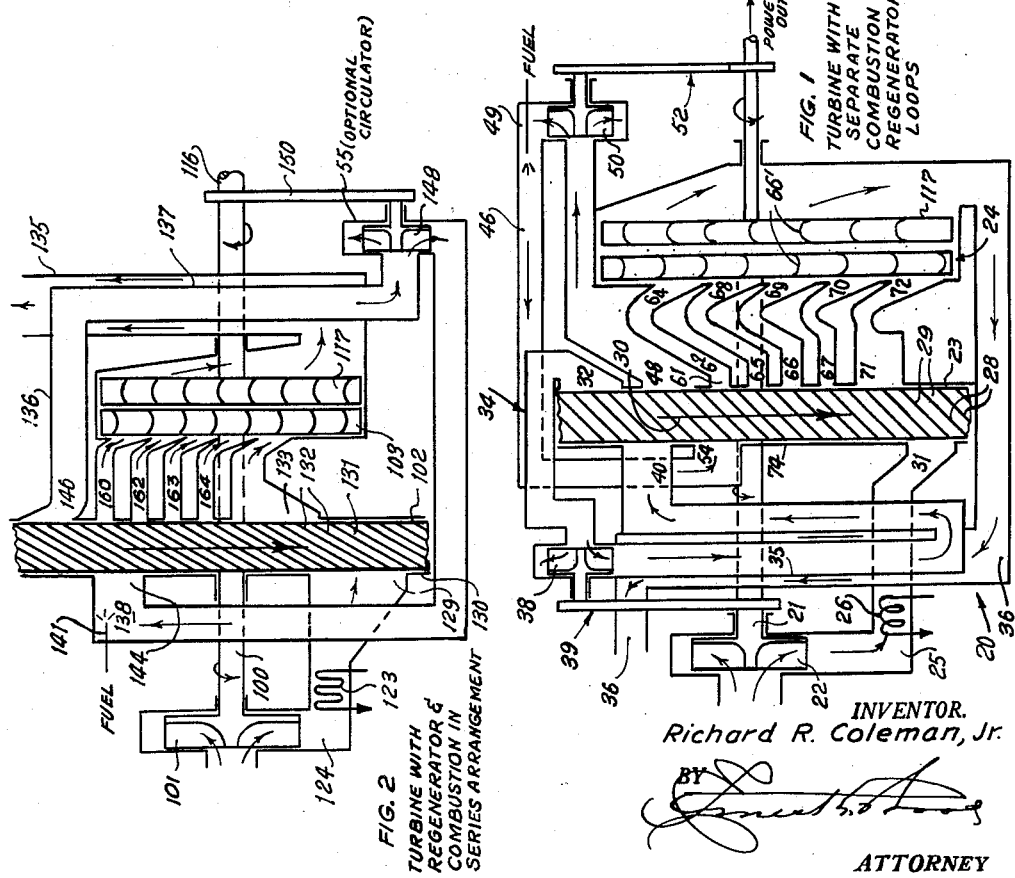

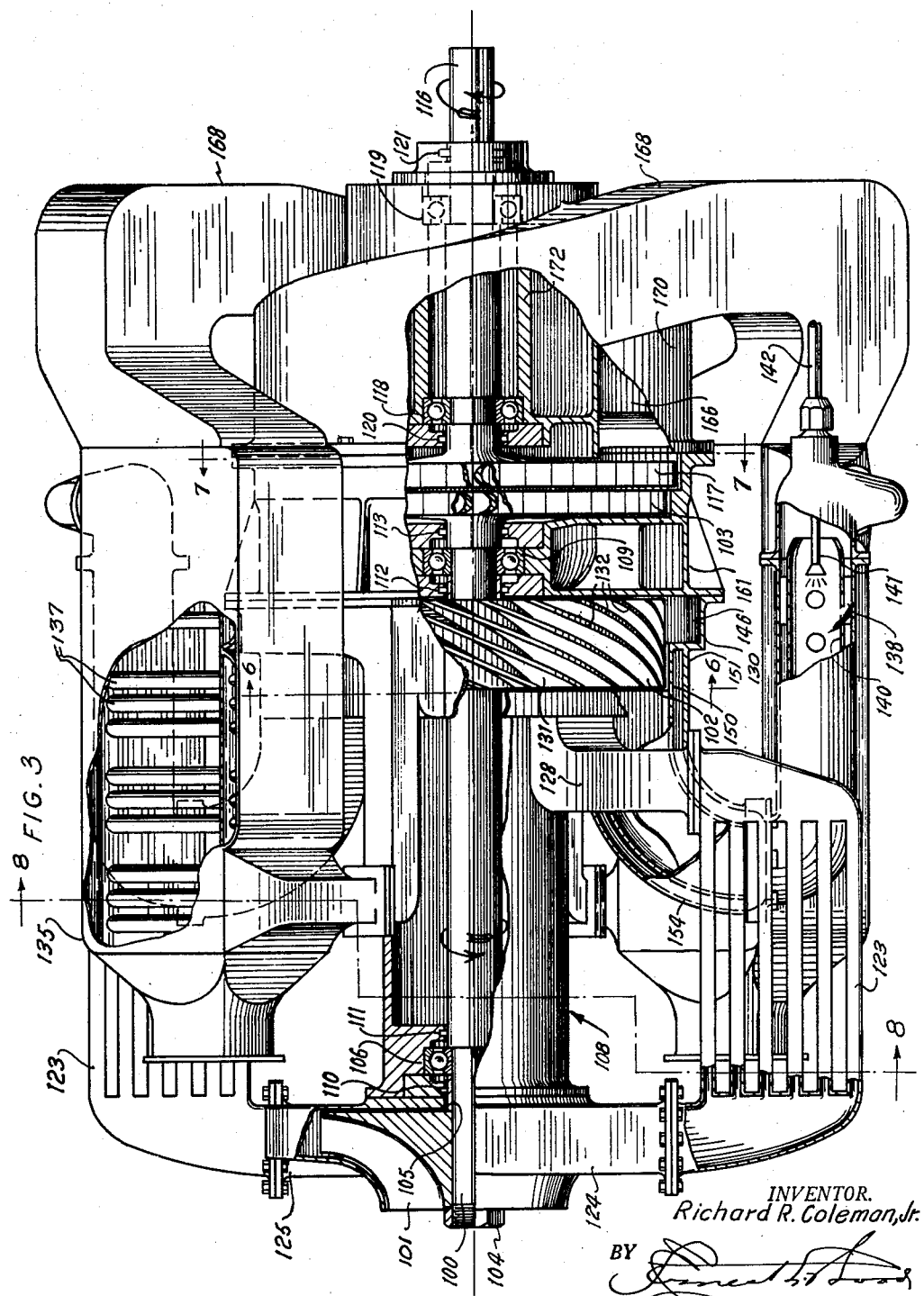

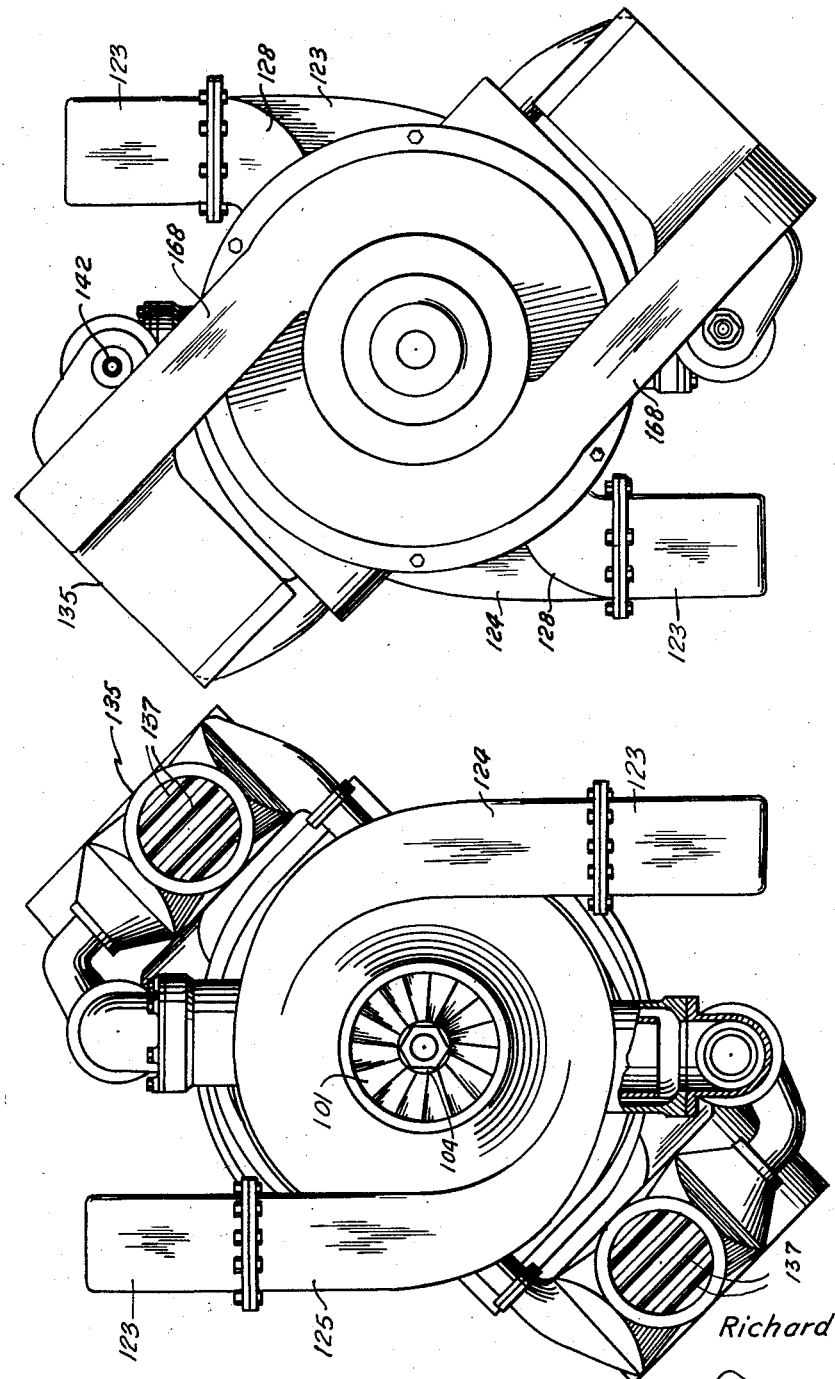

ATTORNEY

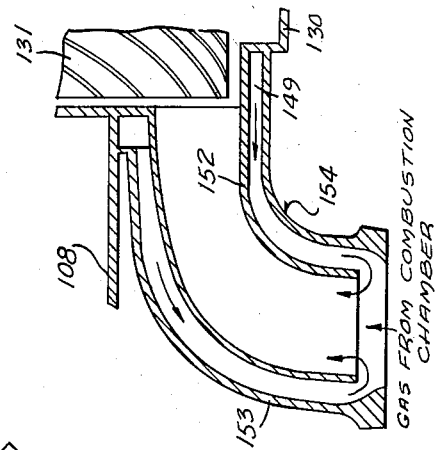
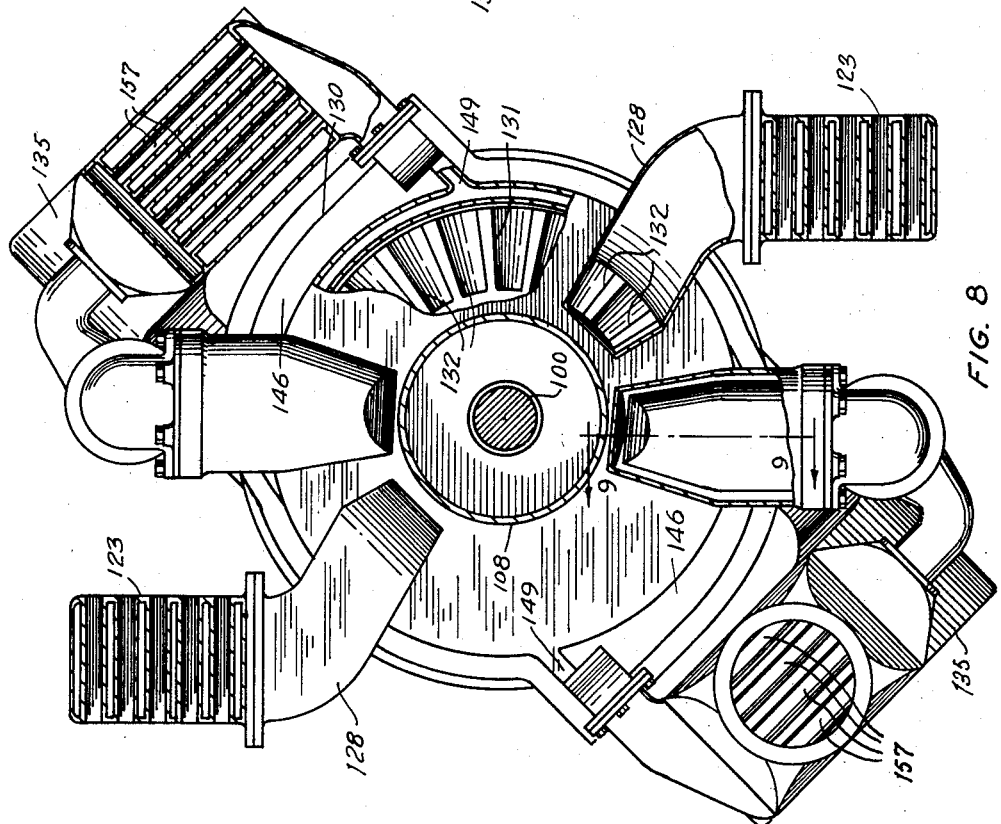

United States Patent Office 2,864,237
Patented Dec. 16, 1958

2,864,237

GAS TURBINE ENGINE HAVING ROTARY COMPRESSOR AND TURBINE DRIVEN BY COMPRESSED GAS

Richard R. Coleman, Jr., Dallas, Tex.

Application May 23, 1955, Serial No. 510,425

9 Claims. (Cl. 60—39.45)

This invention relates to gas turbine engines and more particularly to turbine engines having pressure exchangers between the turbine and the rotary compressor.

An object of the invention is to produce a new and improved gas turbine engine having a rotary compressor and a turbine driven by the gas compressed by the compressor.

Another object of the invention is to provide a new and improved gas turbine engine of the type described wherein the expansion pressure ratio across the turbine is greater than the compression pressure ratio of the rotary compressor.

Still another object of the invention is to provide a gas turbine engine, of the type described, wherein a fuel is burned continuously in a combustion circuit or loop.

A further object of the invention is to provide a gas turbine engine, of the type described, having means for utilizing the heat from exhaust gases to improve the efficiency of the engine by regeneration.

A still further object of the invention is to provide a new and improved gas turbine engine, of the type described, wherein the turbine is isolated from the rotary compressor so far as gas flow through the turbine and rotary compressor is concerned in order to reduce surging and combustion instability, which often affects the operation of conventional constant pressure gas turbines, by interposing a pressure exchanger between the turbine and the rotary compressor.

Another object is to provide a gas turbine engine having a turbine, which can effectively utilize the varying exit gas velocities from the pressure nozzles which direct the high pressure gas to the turbines.

Still another object of the invention is to provide a gas turbine engine, of the type described, wherein the pressure exchanger also functions as a power producing means.

With the foregoing objects in view, the invention has further reference to certain features of accomplishment which will become apparent as the description proceeds, taken in connection with the accompanying drawings.

In the drawing,

Figure 1 schematically illustrates a gas turbine engine embodying the invention and having a turbine of the impulse type, with regeneration and combustion in separate circuits or loops.

Figure 2 schematically illustrates a gas turbine engine embodying the invention and having a turbine of the impulse type, with regeneration and combustion in series within the same circuit.

Figure 3 is a side view with some portions broken away of a gas turbine having a turbine of the impulse type;

Figure 4 is a left end view of the engine shown in Figure 3;

Figure 5 is a right end view of the engine shown in Figure 3;

Figure 8 is a staggered section taken along line 8—8 of Figure 3; and

Figure 9 is a sectional view taken on line 9—9 of Figure 8.

Figure 7:
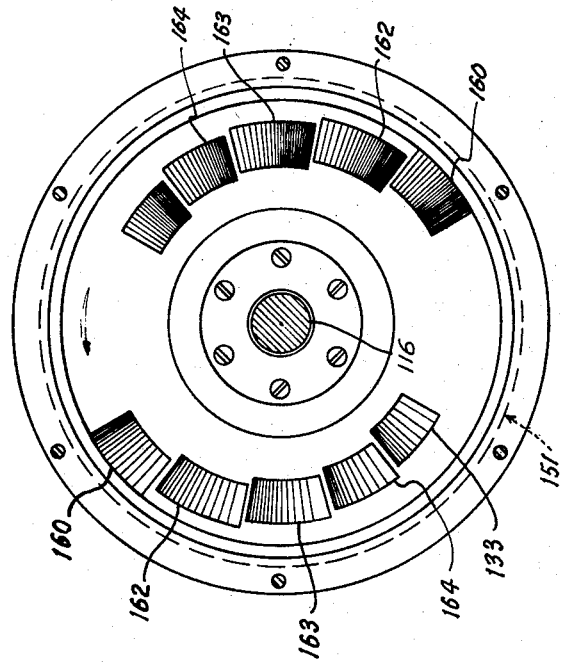
Figure 7 is a sectional view taken on the line 7—7 of Figure 3 with the turbine wheels removed.

Referring now particularly to Figure 1 of the drawing, a gas turbine engine 20 is schematically illustrated and includes a main shaft 21 on which is mounted a rotary compressor 22, a pressure exchanger 23, and a turbine 24 of the impulse type. The rotary compressor 22 may be of the radial flow type, and the air so compressed is conducted by means of a duct 25 to the pressure exchanger 23. An intercooler means 26 of any suitable type is provided to cool the compressed air before it reaches the pressure exchanger.

The pressure exchanger 23 comprises a plurality of blades 28 which are of such shape as to form helicoidal chambers 29 of constant axial pitch between adjacent blades. The cooled compressed air passing through the duct 25 is trapped in the chambers 29 of the pressure exchanger as the latter rotates in the direction indicated by the arrow 30 past the port 31 of the duct 25. Continued rotation of the pressure exchanger subsequently exposes the trailing ends of the chambers 29 to the port 32 of a closed circulating air loop or duct 34, which may be referred to as a regenerator circuit since a portion 35 thereof is positioned in heat transfer relation to an exhaust duct 36 through which exhaust gases of the engine are passed to the atmosphere. Due to this heating of the air, the air in the air loop 34 is under high pressure and is circulated through the air loop or regenerator circuit by a circulator or blower 38 which is driven from the main shaft 21 by means of any suitable mechanical transmission 39 illustrated in Figure 1 as being of the belt and pulley type.

The high pressure compressed air flows through the port 40 into the chambers 29 so that the air in the chambers is compressed to the same pressure as the air in the regenerator circuit. Upon further rotation of the pressure exchanger 23, the opposite or leading ends of the chambers 29 are successively brought into registry with the high temperature port 40 of the regenerator circuit so that the compressed charges of air which were introduced into the chambers 29 through the compressor duct 25 are replaced by equal weights of high temperature air which has traversed the regenerator circuit. The final temperature of the air which was originally introduced into the chambers 29 and subsequently compressed by high pressure air in regenerator loop 34, depends upon the polytropic efficiency of the compression process. The maximum pressure obtained in the chambers, however, is fixed by the pressure of the air contained within the regenerator circuit.

At equilibrium conditions in the cycle, the weight of the air entrapped by a chamber 29 immediately before exposure to the regenerator circuit ports 32 and 40, as the chamber approaches the port 32 in the direction of rotation, must be equal to the weight of air contained within this chamber immediately after its being shut off from the regenerator circuit ports 32 and 40 by continued rotation of the pressure rotor. Since this equality of weight must exist, the pressure in the regenerator circuit is related to the pressure at the port 31 to the pressure exchanger by the constant volume relationship. This is the same as the discharge pressure from the rotary compressor if no allowance is made for pressure drop between the rotary compressor 22 and the port 31.

Further rotation of the pressure exchanger 23 successively brings the trailing end of the chambers 29 into registry with the low temperature port 48 of the combustion circuit 46. The combustion circuit is provided with a fuel nozzle 49 through which fuel is introduced or sprayed into the combustion circuit. Air may be circulated through the combustion circuit by a circulator 50 which may be driven from the main shaft by a suitable mechanical transmission illustrated in Figure 1 as a belt and pulley transmission 52. Flow of high pressure air through the low temperature end of the combustion circuit successively compresses the charges of air in the chambers 29 which were introduced thereinto by the regenerator circuit as was previously described.

The chambers 29 at this point contain a weight of air at the maximum pressure in the cycle.

As the pressure exchanger continues its rotation, the leading ends of the helicoidal chambers are successively exposed to the high temperature port 54 of the combustion circuit, and the compressed charges of air are pumped out of the chamber, being replaced by an equal volume of gases. Correct placement of the ports 48 and 54 determines the scavenging and prevents the gases from flowing out the trailing ends of the helicoidal chambers 29.

Continued rotation of the pressure exchanger exposes the trailing ends of the chambers to a port 61 which is the opening to a duct 62 leading to the high pressure nozzle 64 of the turbine which directs the escaping air and gas from the chambers against the blades 66' of the turbine, thus causing the turbine to rotate the main shaft 22 and output shaft. Immediately upon being exposed to this port 61 the gas within the chambers 29 begins to flow out the trailing end of the helicoidal chambers. The pressure begins to drop within the chambers and continues to drop until the trailing ends of the chambers are closed off from port 61 by rotation of the pressure exchanger.

During the time interval that the trailing end of each chamber 29 is exposed to the port 61, the pressure before the high-pressure nozzle decreases from the maximum pressure of the cycle to some lower pressure. This lower pressure is determined by several mechanical as well as thermodynamic factors, among them being the density, the initial temperature, and pressure of the gas in the chamber; the time interval during which the chamber is connected to the nozzle port 61 and the ratio of the combined volumes of the helicoidal chamber and the nozzle duct to the cross sectional area of the nozzle throat or exit. As the pressure before the nozzle 64 varies, so does the efflux velocity of the nozzle. One of the features of this invention is the means of relating this varying nozzle exit velocity to the constant peripheral velocity of the turbine blades in order to maintain a high turbine efficiency.

As the pressure exchanger continues to rotate, each intermediate pressure nozzle port such as 65, 66 and 67 is in turn exposed to the helicoidal chamber 29, and the process as described for the high pressure nozzle is repeated at successively decreasing pressures so that air and gases from the chambers 29 are directed against the blades 66' of the turbines through the intermediate pressure nozzles 68, 69 and 70, respectively.

During the same period in which the trailing end of the helicoidal chamber is exposed to the high pressure and intermediate pressure nozzle ports, the leading end of the chamber is sealed off by the wall 74 of the pressure exchanger housing. Thus, as the gases in the chamber expand to the rear, a reactive thrust on the pressure exchanger is provided which tends to rotate the pressure exchanger. Each helicoidal chamber which is exposed to the nozzle ports acts then as a pure reaction element.

Ideally, the final pressure of the gas, as the chamber is closed off from the last intermediate nozzle port 67 is equal to the scavenging air pressure from the intercooler; and as the rotation continues, both ends of the chamber are exposed simultaneously to the scavenging ports 31 and 71 where the hot gases are swept from the chamber by the incoming air from the rotary compressor (which has passed through the intercooler of course). These scavenging gases pass on to expand through the low pressure nozzle 72 which directs these gases against the turbine blades 66'. The cycle is now ready to repeat itself.

The rotation of the pressure exchanger is, of course, continuous and of constant angular velocity for given equilibrium conditions.

In Figures 2 to 9, inclusive is illustrated a form of the gas turbine engine having a main shaft 100 on which are rigidly mounted a rotary compressor 101 and a pressure exchanger 102 which correspond to the rotary compressor 22 and pressure exchanger 23 of Figure 1. A turbine wheel 103 is also rigidly mounted on the main shaft 100. A nut 104 on the end of the main shaft secures the rotary compressor, a spacer 105 and a bearing 106 on the main shaft. The main shaft is rotatably mounted in the engine housing 108 on the bearing 106 and a bearing 109. Labyrinth seals 110, 111, 112, and 113 reduce leakage from the rotary compressor and the pressure exchanger. A second shaft 116 on which the second turbine wheel 117 is mounted is rotatably mounted in the engine housing by means of bearings 118 and 119 and labyrinth seals 120 and 121 prevent leakage past the second shaft 116.

The air compressed by the rotary compressor is moved through a pair of intercoolers 123 which are connected to the discharge ducts 124 and 125 of the rotary compressor by means of bolted flanges, or in any other suitable means.

The air, after passing through the intercoolers 123 passes through the elbows 128 to the ports 129 (Figures 2 and 6) in the rotor housing 130 where the compressed and cooled air scavenges the hot gases in the helicoidal chambers 131 formed by the pressure exchanger blades 132 through the outlet port 133, Figures 2 and 7. The exhaust gases are passed to the atmosphere through the exhaust duct 135.

Instead of separate regenerator and combustion circuit or loops, the turbine engine of Figures 2 and 3 employs a single combined regenerator and combustion circuit or loop 136 which includes the tubes 137 located in the exhaust duct 135 where the air is passed in counterflow direction with respect to the exhaust gases moving through the exhaust duct.

The regeneration and combustion circuit also includes a combustion chamber 138 having a flame tube 140, into which fuel is sprayed through the fuel nozzle 141. The fuel nozzle is connected to a fuel pump, not shown, by a tube or pipe 142.

It will be apparent that the main flow of air in the combined regenerator and combustion circuit moves from the combustion chamber 138 through the ports 144 and into the helicoidal chambers 131 of the pressure exchanger and thence through the outlet port and diffuser 146 to the regenerator tubes 137 in the exhaust duct 135. From the regenerator tubes the air moves to the combustion chamber 138. If desired, a circulator 148 (Figure 2) driven by a suitable mechanical transmission 150 may be provided to help move the air through the combined regenerator combustion circuit to augment the pressure developed in the diffuser 146. The pressure rise in diffuser 146 results from the velocity of the air as it leaves the pressure exchanger and enters the diffuser.

Figure 6:
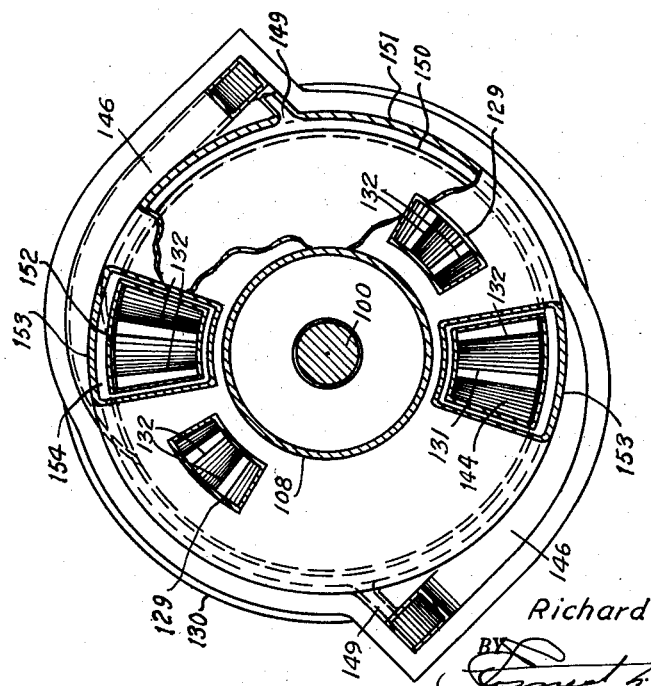
Figure 6 is a sectional view taken on the line 6—6 of Figure 3.

A part of the air that leaves the helicoidal chambers 131 of the pressure exchanger through the outlet port 145 passes through a duct 149, Figures 3, 6 and 9, into the space between the inner wall 150 and the outer wall 151 of the pressure exchanger housing where it circulates approximately as shown by the arrows, flowing from the casing between the inner wall 152 and the outer walls 153 of the elbow 154. At the flange where the elbow 154 and the combustion chamber 138 are connected this air joins the hot gases from the combustion chamber and together they return to the pressure exchanger helicoidal chambers through the ports 144.

The hot gases leaving the helicoidal chambers as the pressure exchanger rotates pass into the high pressure ports 160 of the nozzle box 161, and then through the intermediate ports 162, 163 and 164 to the turbine wheels 103 and 117 which are thus caused to rotate.

At the low pressure outlet port or nozzle 133, the gases are scavenged by the incoming fresh air from the intercoolers 123 by way of elbow ducts 128 through ports 129.

The gases combine at exhaust pressure after passing through the turbine wheels 103 and 107 and collect in the annulus 166 formed by the exhaust ducts 168 and the outside wall 170 of the bearing support member 172. The exhaust ducts 168 carry the turbine efflux gas to the regenerator 135 through which it flows and gives up part of its heat to the air in the regenerator tubes 137 as has already been described.

It will now be apparent that a new and improved gas turbine engine has been illustrated and described which includes a rotary compressor, an intercooler which cools the air compressed by the rotary compressor, a pressure exchanger mounted on the same shaft as the rotary compressor having helicoidal chambers formed by its blades which receive the compressed and cooled air, a regenerator circuit in which air which has been heated by exhaust gases of the engine replaces the compressed and cooled air in the helicoidal chambers of the pressure exchanger as the latter rotates, a combustion circuit wherein fuel is burned to generate high temperature and pressure gases which in turn replace the regenerated air in the helicoidal chambers as the pressure exchanger continues to rotate, and nozzle means for directing the expanding hot gases to the blades of a turbine to cause the latter to rotate.

It will also be apparent that in one modification of the turbine engine, a single combined regenerator and combustion circuit is employed wherein the air passing to the combustion chamber where fuel is burned is preheated or regenerated by the exhaust gases of the engine.

What is claimed is:

1. A gas turbine engine comprising a main shaft; a rotary compressor driven by said shaft; a pressure exchanger mounted on said shaft and having chambers for receiving air compressed by said rotary compressor; means between said rotary compressor and said pressure exchanger for delivering air from said compressor to said chamber; a regenerator circuit having means for supplying high pressure air to said chambers to replace the compressed air previously supplied to the chambers by the rotary compressor, said regenerator circuit being in heat exchange relationship to the exhaust gases of the engine for extracting heat from exhaust gases of the engine to heat the air supplied to the chambers of the pressure exchanger; a combustion circuit wherein fuel is burned at a constant pressure and having means operatively associated with the heat exchanger for replacing the high pressure air in the chambers of the pressure exchanger with combustion products; and a turbine connected to said shaft and means for directing said combustion products to said turbine to rotate said shaft.

2. A gas turbine engine comprising a main shaft; a rotary compressor driven by said shaft; a turbine connected to said shaft; a pressure exchanger mounted on said shaft and having chambers for receiving air compressed by said rotary compressor; means between said compressor and said pressure exchanger for delivering air from said compressor to said chambers; a regenerator circuit having means for supplying high pressure air to said chambers to replace the compressed air previously supplied to the chambers by the rotary compressor; a combustion circuit operatively associated with said pressure exchanger and wherein fuel is burned for replacing the high pressure air in the chambers supplied by the regenerator circuit with combustion products; means for directing said combustion products to said turbine to rotate said shaft, and means connected to said turbine for passing hot exhaust gases from the turbine in heat exchange relation to said regenerator circuit whereby the air supplied to the chambers by the regenerator circuit is preheated.

3. A gas turbine engine comprising a main shaft; a rotary compressor driven by said shaft; a pressure exchanger mounted on said shaft and having chambers for receiving air compressed by said rotary compressor; means between said compressor and said pressure exchanger for delivering air from said compressor to said changers; a regenerator circuit having means for supplying high pressure air to said chambers to replace the compressed air previously supplied to the chambers by the rotary compressor, said regenerator circuit being in heat exchange relationship with the exhaust gases of the engine for extracting heat from exhaust gases of the engine to heat the air supplied to the chambers of the pressure rotor; a combustion circuit operatively associated with said pressure exchanger and wherein fuel is burned at a constant pressure for replacing the high pressure air in the chambers of the rotor with combustion products; a turbine connected to said shaft, means for directing said combustion products to said turbine to rotate said shaft, and means for circulating air through said regenerator circuit and into said chambers.

4. A gas turbine engine comprising a main shaft; a rotary compressor driven by said shaft; a turbine connected to said shaft; a pressure enchanger mounted on said shaft and having chambers for receiving air compressed by said rotary compressor; means between said compressor and said pressure exchanger for delivering air from said compressor to said chambers; a regenerator circuit for supplying high pressure air to said chambers to replace the compressed air previously supplied to the chambers by the rotary compressor; a combustion circuit operatively associated with said pressure exchanger and wherein fuel is burned for replacing the high pressure air in the chambers supplied by the regenerator circuit with combustion products; means for directing said combustion products to said turbine to rotate said shaft, means connected to said turbine for passing hot exhaust gases from the turbine in heat exchange relation to said regenerator circuit whereby the air supplied to the chambers by the regenerator circuit is preheated, and means for circulating air through said regenerator circuit and into said chambers.

5. A gas turbine engine comprising a main shaft; a rotary compressor driven by said shaft; a pressure exchanger mounted on said shaft and having chambers for receiving air compressed by said rotary compressor; means between the compressor and the pressure exchanger for delivering air from the compressor to the chambers; a regenerator circuit having means for supplying high pressure air to said chambers to replace the compressed air previously supplied to the chambers by the rotary compressor, said regenerator circuit being in heat exchange relationship to exhaust gases of the engine and extracting heat from the exhaust gases of the engine to heat the air supplied to the chambers of the pressure rotor; a combustion circuit operatively associated with said pressure exchanger and wherein fuel is burned at a constant pressure for replacing the high pressure air in the chambers of the rotor with combustion products, said chambers having a substantially helicoidal form; a turbine connected to said shaft and means for directing said combustion products to said turbine to rotate said shaft.

6. A gas turbine engine comprising a main shaft; a rotary compressor driven by said shaft; a turbine connected to said shaft; a pressure exchanger mounted on said shaft and having chambers for receiving air compressed by said rotary compressor; means between the compressor and the pressure exchanger for delivering air from the compressor to the chambers; a regenerator circuit having means for supplying high pressure air to said chambers to replace the compressed air previously supplied to the chambers by the rotary compressor; a combustion circuit operatively associated with said pressure exchanger and wherein fuel is burned for replacing the high pressure air in the chambers supplied by the regenerator circuit with combustion products; means for directing said combustion products to said turbine to rotate said shaft, and means connected to said turbine for passing hot exhaust gases from the turbine in heat exchange relation to said regenerator circuit whereby the air supplied to the chambers by the regenerator circuit is preheated, said chambers having a helicoidal form.

7. A gas turbine engine comprising a main shaft; a rotary compressor driven by said shaft; a turbine connected to said shaft; a pressure exchanger mounted on said shaft and having chambers for receiving air compressed by said rotary compressor; means between the compressor and the pressure exchanger for delivering air from the compressor to the chambers; a regenerator circuit having means for supplying high pressure air to said chambers to replace the compressed air previously supplied to the chambers by the rotary compressor; a combustion circuit operatively associated with the pressure exchanger and wherein fuel is burned for replacing the high pressure air in the chambers supplied by the regenerator circuit with combustion products; and means successively connecting each of said chambers with turbine nozzles of successively lower operating gas pressures as the pressure exchanger rotates, said turbine nozzles directing the combustion products from the chambers to turbine blades of the turbine whereby the shaft is rotated.

8. A gas turbine engine comprising a main shaft; a rotary compressor driven by said shaft; a turbine connected to said shaft; a pressure exchanger mounted on said shaft and having chambers for receiving air compressed by said rotary compressor; means between the compressor and the pressure exchanger for delivering air from the compressor to the chambers; a regenerator circuit having means for supplying high pressure air to said chambers to replace the compressed air previously supplied to the chambers by the rotary compressor; a combustion circuit operatively associated with the pressure exchanger and wherein fuel is burned for replacing the high pressure air in the chambers supplied by the regenerator circuit with combustion products; means successively connecting each of said chambers with turbine nozzles of successively lower operating gas pressures as the pressure exchanger rotates, said turbine nozzles directing the combustion products from the chambers to turbine blades of the turbine whereby the shaft is rotated; and means connected to said turbine for passing hot exhaust gases from the turbine in heat exchange relation to said regenerator circuit whereby the air supplied to the chambers by the regenerator circuit is preheated.

9. A gas turbine engine comprising a main shaft; a rotary compressor driven by said shaft; a turbine connected to said shaft; a pressure exchanger mounted on said shaft and having chambers for receiving air compressed by said rotary compressor; means between the compressor and the pressure exchanger for delivering air from the compressor to the chambers; a regenerator circuit having means for supplying high pressure air to said chambers to replace the compressed air previously supplied to the chambers by the rotary compressor; operatively associated with the pressure exchanger and a combustion circuit wherein fuel is burned for replacing the high pressure air in the chambers supplied by the regenerator circuit with combustion products; and means successively connecting each of said chambers with turbine nozzles of successively lower operating gas pressures as the pressure rotor rotates, said turbine nozzles directing the combustion products from the chambers to turbine blades of the turbine whereby the shaft is rotated, the lowest pressure nozzle successively connecting the chambers then communicating with the rotary compressor whereby gases remaining in the chambers are scavenged by compressed air.

References Cited in the file of this patent

UNITED STATES PATENTS 2,461,186   Seippel _____ Feb. 8, 1949

FOREIGN PATENTS 67,969   Austria _____ Feb. 25, 1915